United States Patent
Kehne et al.

(10) Patent No.: US 6,944,854 B2
(45) Date of Patent: Sep. 13, 2005

(54) METHOD AND APPARATUS FOR UPDATING NEW VERSIONS OF FIRMWARE IN THE BACKGROUND

(75) Inventors: Kevin Gene Kehne, Austin, TX (US); Chetan Mehta, Austin, TX (US); Jayeshkumar M. Patel, Austin, TX (US); Kasturi Patel, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 780 days.

(21) Appl. No.: 09/726,290

(22) Filed: Nov. 30, 2000

(65) Prior Publication Data

US 2002/0092008 A1 Jul. 11, 2002

(51) Int. Cl.⁷ .................................................. G06F 9/44
(52) U.S. Cl. ......................... 717/168; 713/2; 713/100; 714/36
(58) Field of Search .................................. 717/168–173; 714/41, 36; 455/419; 713/1, 2, 100

(56) References Cited

U.S. PATENT DOCUMENTS

| | | | | |
|---|---|---|---|---|
| 5,117,430 A | * | 5/1992 | Berglund | 370/408 |
| 5,339,450 A | * | 8/1994 | Nagahara | 717/170 |
| 5,568,641 A | * | 10/1996 | Nelson et al. | 713/2 |
| 5,729,675 A | * | 3/1998 | Miller et al. | 714/36 |
| 5,822,692 A | * | 10/1998 | Krishan et al. | 455/419 |
| 5,935,252 A | * | 8/1999 | Berglund et al. | 713/300 |
| 6,003,065 A | * | 12/1999 | Yan et al. | 709/201 |
| 6,189,050 B1 | * | 2/2001 | Sakarda | 710/18 |
| 6,357,021 B1 | * | 3/2002 | Kitagawa et al. | 714/41 |
| 6,374,353 B1 | * | 4/2002 | Settsu et al. | 713/2 |
| 6,640,334 B1 | * | 10/2003 | Rasmussen | 717/171 |

OTHER PUBLICATIONS

Michael Barr, "Programming Embedded Systems in C and C++", Jan. 1999, O'Reilly & Associates, First Edition, ISBN 1-56592-354-5, pp. 60 and 61.*

"Microsoft Press Computer User's Dictionary", 1998, Microsoft Press, ISBN 1-57231-862-7, pp. 146, 213, 246.*

Synchrotech, Inc., "An Introduction to PCMCIA and PC Card Technology", 1995, [online, archived Aug. 2001, accessed Dec. 3, 2003], <http://web.archive.org/web/20010821094552/http://www.synchrotech.com/support/intro.html>.*

* cited by examiner

Primary Examiner—Tuan Dam
Assistant Examiner—J. Derek Rutten
(74) Attorney, Agent, or Firm—Duke W. Yee; Mark E. McBurney; Gerald H. Glanzman

(57) ABSTRACT

A method, system, and computer program for updating firmware in a data processing system as a background operation allowing a user to utilize the computer for other purposes during the update process is provided. In one embodiment, after an operating system has been loaded and control has been transferred from the service processor to the host, the service processor determines whether the level of a firmware copy on a system component, such as an SPCN card, matches the current level of firmware stored on a non-volatile memory accessible to the service processor. If the level of the firmware copy in the component is different from the current level, the service processor transfers the current level of firmware from the non-volatile memory accessible to the service processor to the system component.

36 Claims, 3 Drawing Sheets

METHOD AND APPARATUS FOR UPDATING NEW VERSIONS OF FIRMWARE IN THE BACKGROUND

BACKGROUND OF THE INVENTION

1. Technical Field

The present invention relates to an improved data processing system and, more particularly, to an improved method of updating firmware.

2. Description of Related Art

Currently, many of the more complex computers that are used for services such as web servers are multiprocessor computers. These computers often have a "service processor" that is used to perform many tasks that affect the computer as a whole, such as, for example, monitoring the temperature of the computer so that the exhaust fan may be turned on and off at appropriate times. The service processor may also monitor other resources within the system shared by the many different host operating systems that may be executing on the computer.

The service processor, during a power on event to the computer, executes a variety of tasks contained in firmware. One of the functions performed by the service processor during this power on event is to broadcast the power on event to all tasks, including the system power control network (SPCN) task. When the SPCN task receives the power on event, it will collect the firmware level information on the SPCN card while the system is booting up. At this time, the SPCN task will read the SPCN firmware level (i.e. version) on the service processor flash. If that firmware level does not match with the level of firmware on the SPCN card, then the SPCN task will transmit a new SPCN firmware image to the SPCN card while the OS is running. This SPCN firmware typically takes 45 minutes to complete for a four (4) drawer computer system. If there are more drawers in the system, then it will take longer than 45 minutes to update. Currently, the operating system cannot be loaded until this firmware update is finished. Thus, the user may have to wait an hour or more before the system is usable. Therefore, it would be desirable to have a method of updating the SPCN firmware that allowed the computer to be usable for other tasks sooner than current systems.

SUMMARY OF THE INVENTION

The present invention provides a method, system, and computer program for updating system firmware in a data processing system as a background operation allowing a user to utilize the computer for other purposes during the update process. In one embodiment, after an operating system has been loaded and control has been transferred from the service processor to the host, the service processor determines whether the level of a firmware copy on a system component, such as an SPCN card, matches the current level of firmware stored on a non-volatile memory accessible to the service processor. If the level of the firmware copy in the component is different from the current level, the service processor transfers the current level of firmware from the non-volatile memory accessible to the service processor to the system component.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
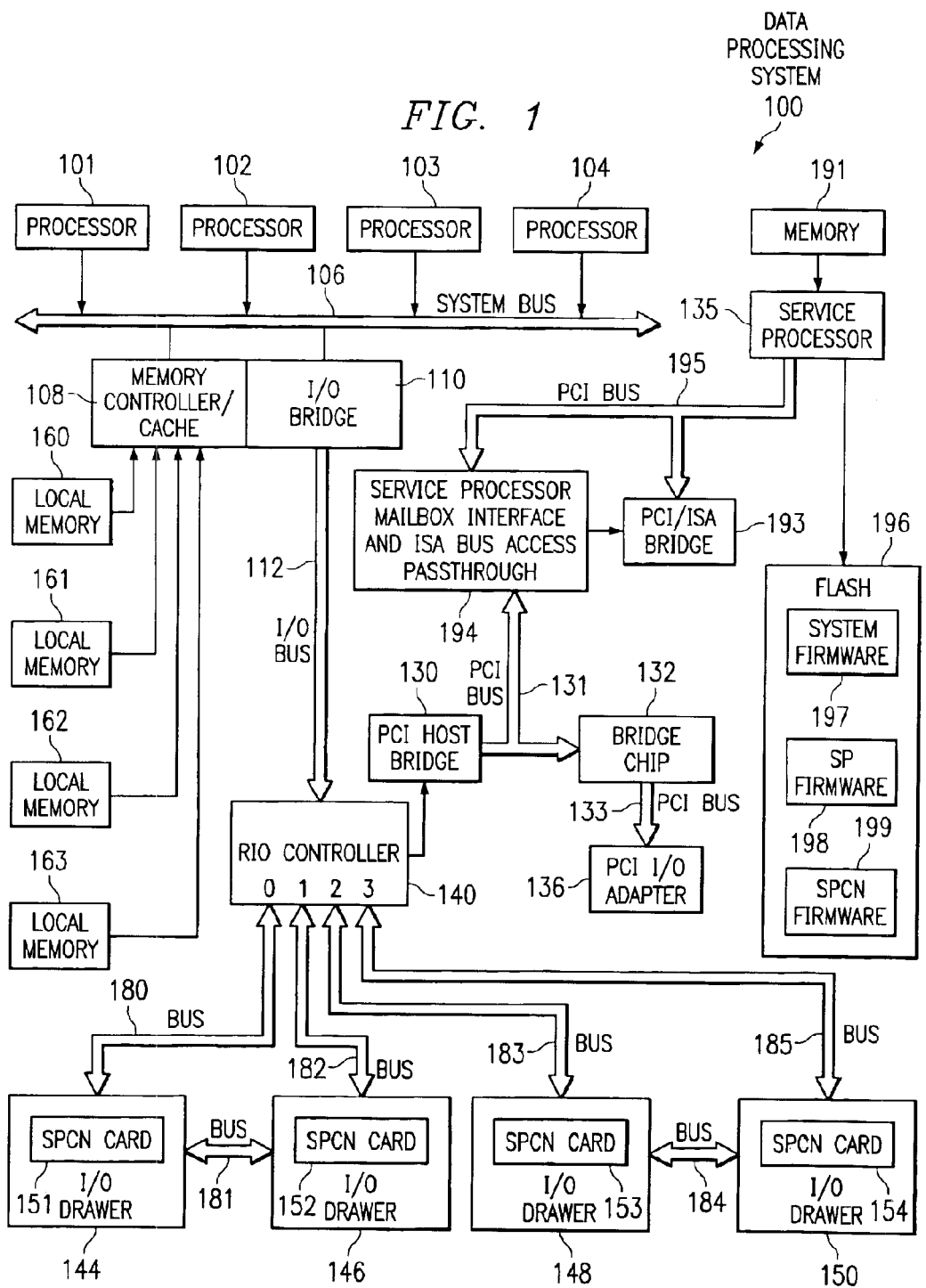
FIG. 1 depicts a block diagram of a data processing system in which the present invention may be implemented.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM RS/6000, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted.

An RIO Controller 140 provides an interface between processors 101–104 and local memories 160–163 with I/O drawers 144–150. I/O drawers 144–150 collectively comprise an expansion tower. I/O drawers 144–150 are powered independently from the rest of the data processing system containing the processors 201–204 and memory 160–163. Connection between the I/O drawers 144–150 and RIO Controller is made through buses 180–185 as depicted which consist of cables including System Power Control Network (SPCN), Remote Input Output (RIO) cables, JTAG buses, and operator panel cables. Bus 180 provides a connection between node 0 of RIO Controller 140 and I/O drawer 144 which is in turn connected to I/O Drawer 146 through bus 181. A return bus 182 connects I/O Drawer 146 to node 1 of RIO Controller 140. Similarly, buses 183–185 are used to connect I/O drawer 148 and 150 to nodes 2 and 3 of RIO Controller 140. Each I/O Drawer 144–150 holds up to 14 PCI I/O adapters. Four succinct PCI buses are present in each of I/O drawers 144–150. Each of I/O drawers 144–150 provides space for up to four media devices, such as, for example, tape drives, CD-ROM drives, and diskette drives, and two DASD bays each holding up to six disk drives.

A PCI host bridge 130 provides an interface for a PCI bus 131 to connect to I/O bus 112. PCI bus 131 connects PCI host bridge 130 to the service processor mailbox interface and ISA bus access pass-through logic 194 and bridge chip 132. The ISA bus access pass-through logic 194 forwards PCI accesses destined to the PCI/ISA bridge 193. The NV-RAM storage is connected to the ISA bus 196. The Service processor 135 is coupled to the service processor mailbox interface 194 through its local PCI bus 195. The service processor 135 has its own local memory 191.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
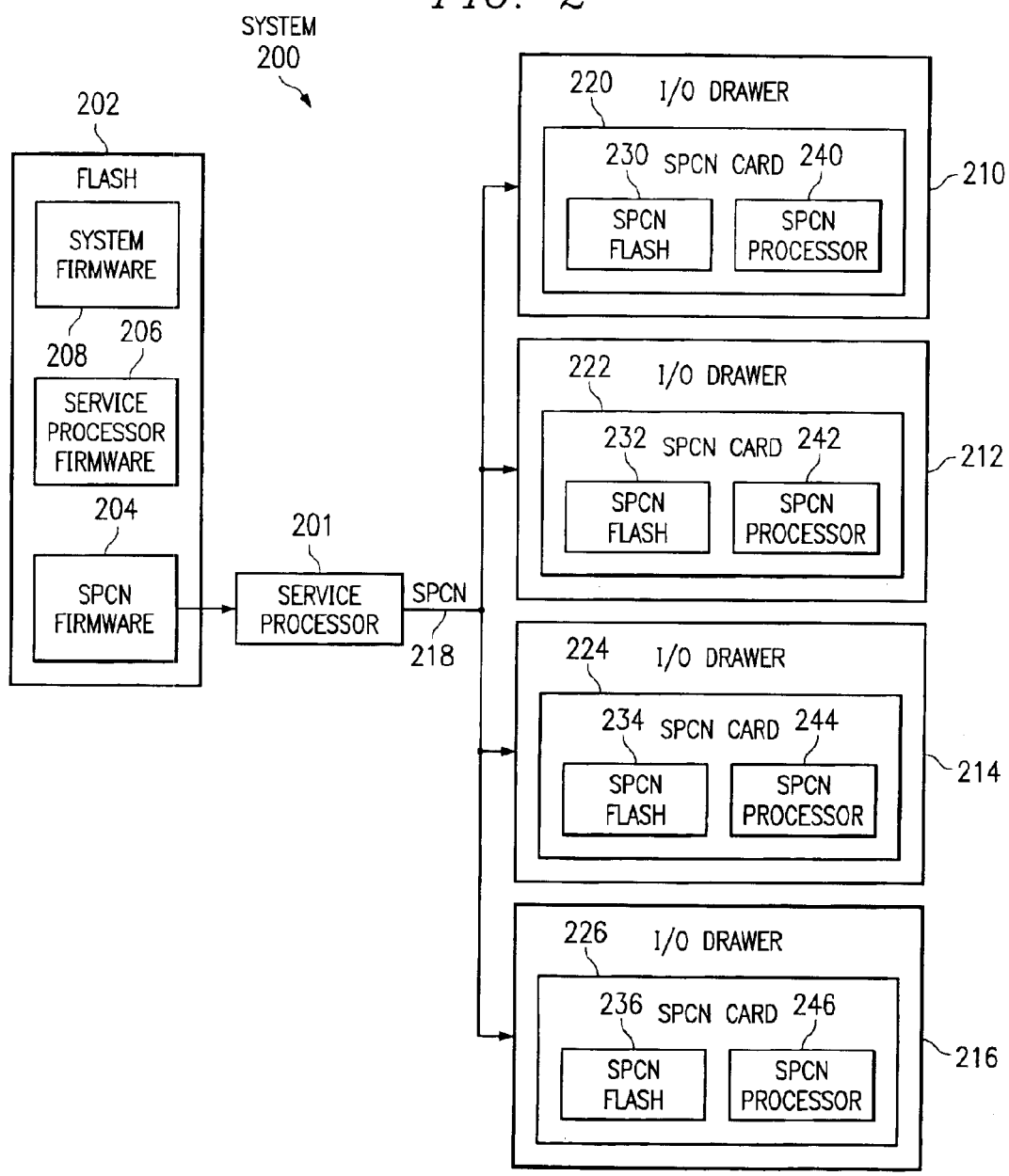
FIG. 2 depicts a block diagram of a system for managing a system I/O drawers connected to multiple networks in accordance with the present invention.

With reference now to FIG. 2, a block diagram of a system for updating SPCN firmware in a system with multiple I/O drawers is depicted in accordance with the present invention. System 200 provides more detail regarding the SPCN system of processing system 100 in FIG. 1 in which the SPCN firmware is to be updated. As discussed above, a system I/O drawer is a modular component for inserting I/O expansion slots into a data processing system. An I/O drawer physically packages several PCI Host Bridges (PHBs) to provide PCI I/O slots for plug-in I/O adapters.

System 200 includes four I/O drawers 210–216, such as, for example, I/O drawers 144–150 in FIG. 1. However, although depicted with four I/O drawers 210–216, one skilled in the art will recognize that more or fewer I/O drawers may be included than depicted in FIG. 2. It should also be noted that some of I/O drawers 210–216 may be connected to service processor 201 through RIO networks only, through SPCN buses only, or through both. The RIO Controller through which I/O drawers 210–216 would be connected to service processor 201 is not shown for clarity. Also not shown are the various connections between I/O drawers 210–216 with each other.

During the boot process of a power on event, service processor 201, which may be implemented, for example, as service processor 135 in FIG. 1, loads the new service processor firmware 206, thus updating the service processor firmware, and executes this new service proessor firmware to collect vital product data from each SPCN card 220–226, in each I/O drawer 210–216. Each SPCN card 220–226 may be implemented as, for example, SPCN cards 151–154 in FIG. 1. Each I/O drawer 210–216 may be implemented as, for example, I/O drawers 144–150 in FIG. 1. The new firmware images have be previously loaded into the service processor's 201 flash memory 202 during a previous user session on the data processing system 200. The new firmware images may include new system firmware 208, new service processor firmware 206, and new SPCN firmware 204. Each SPCN card 220–226 contains a SPCN flash memory 230–236 and a SPCN processor 240–246. The SPCN flash memory 230–236 contains the SPCN firmware image that is executed by the SPCN processor 240–246 to manage power for the drawer while aiding the service processor 201 in collecting the vital product information.

The service processor 201 also broadcasts the power on event to all tasks including the system power control network (SPCN) task on the SPCN card 220–226 within each drawer within the system 210–216. When each SPCN card 220–226 receives the power on event via the SPCN bus 218, it collects information about the physical location of the drawer 210–216 in which it resides, the components within the drawer 210–216 in which it resides, as well as other vital product information about its drawer and components within the drawer 210–216 and transmits this information to the service processor 201. Once the service processor 201 has completed gathering vital product information, the service processor 201 initializes the system, a process which includes providing power to the other components within the system 200, such as, for example, referring to FIG. 1, the processors 101–104, local memories 160–163, PCI host bridge 130, etc.

The service processor 201 then copies the new system firmware 208, that had previously been loaded and stored into flash memory 202, into the system memory, such as, for example, local memories 160–163 in FIG. 1, which then loads the new system firmware into the processors, such as, for example, processors 101–104 in FIG. 1, for execution. Thus, at this point, both the service processor firmware and the system firmware have been updated with the new firmware. However, to save time in initializing the system 200 and to allow a user to use the system 200 sooner, each SPCN card's 220–226 copy of the SPCN firmware remains as is and is not updated until the system 200 has been completely initialized and the operating system is loaded and running. The service processor 201 then transfers control to the system firmware running on the main system processors, such as processors 101–104 in FIG. 1. The service processor 201 and the SPCN cards 220–226 then aid the system firmware in initializing (booting) the data processing system. At this time, although the service processor 201 and main processors, such as, for example, 101–104 are executing updated firmware images, each SPCN processor 240–246 uses its current old version of the SPCN firmware to perform tasks requested of it by the system firmware.

Once the system firmware 206 has finished booting the system and finished loading the operating system (OS), the SPCN cards 220–226 and the service processor 201 will be notified that the OS is running. At this time, the service processor 201 will query each SPCN card 230 to determine the level (version) of the SPCN firmware residing in each SPCN cards SPCN flash memory 230–236. If that level does not match with the SPCN firmware 204 on the service processor's 201 flash memory 202, then the service processor 201 transmits a new firmware image to each SPCN card 220–226, as necessary, using the SPCN firmware 204 stored on flash memory 202. This process is performed in the background while the OS is running, thus enabling the user to utilize the data processing system while the firmware update is accomplished rather than having to wait until the firmware update is completed.

Those of ordinary skill in the art will appreciate that the components depicted in FIG. 2 may vary. For example, more or fewer I/O drawers may be utilized than depicted. Furthermore, the various firmware images may be stored in some other type of non-volatile memory other than flash memory 202, such as, for example, a non-volatile random access memory (NV-RAM). The depicted example is not meant to imply architectural limitations with respect to the present invention.

Figure 3:
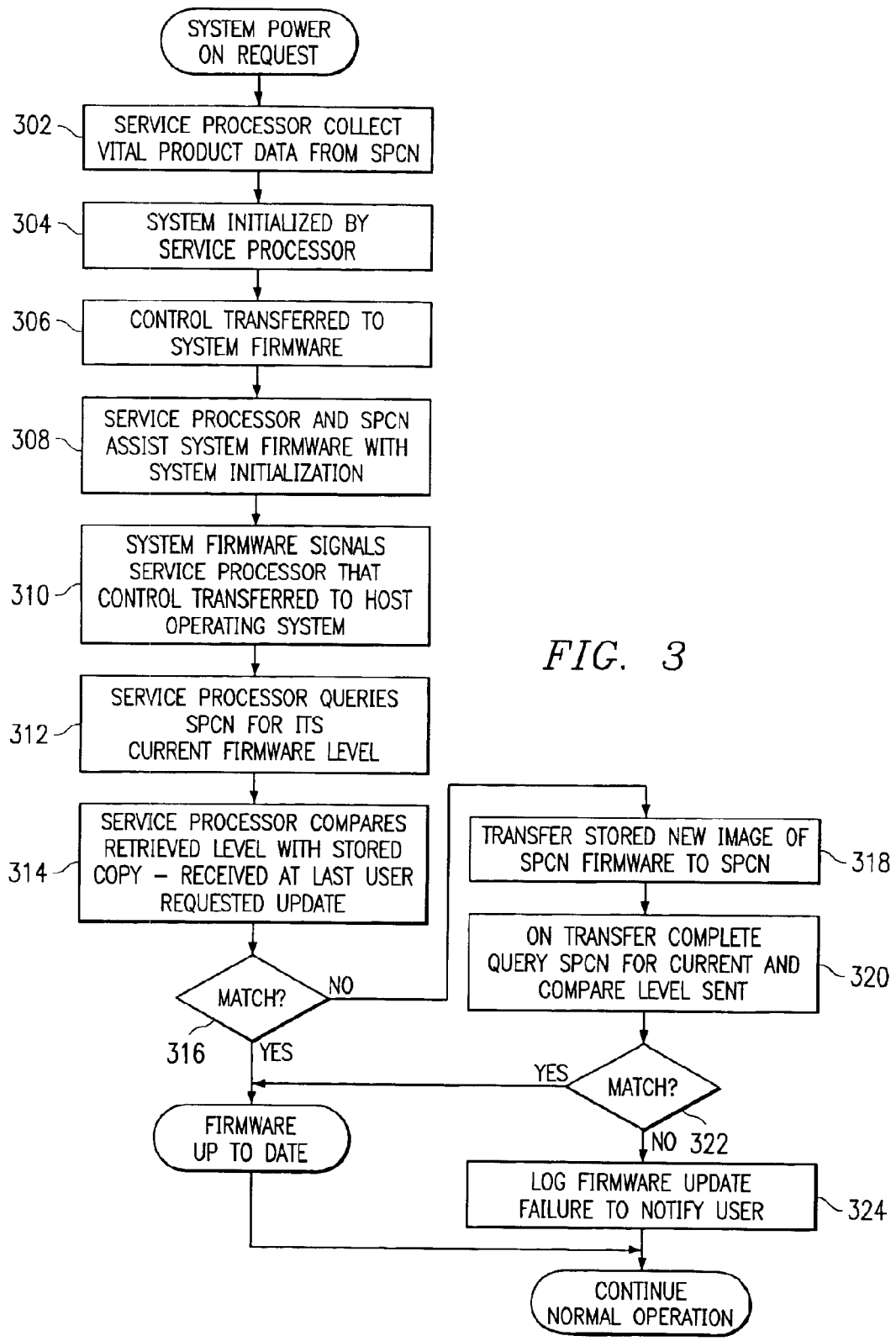
FIG. 3 depicts a flowchart illustrating an exemplary process for updating a new version of firmware for an SPCN card as a background operation in accordance with the present invention.

With reference now to FIG. 3, a flowchart illustrating an exemplary process for updating a new version of firmware for an SPCN card as a background operation is depicted in accordance with the present invention. Once a system power-on request has been received, such as, for example, in response to someone pushing a power button on the computer, the service processor runs the new updated service processor firmware stored in, for example, the SP firmware 198 section of flash memory 196 in FIG.1, and collects vital product data from the SPCN card within each drawer, such as, for example, SPCN cards 210–216 in FIG. 2 (step 302 ). The new firmware may include new system firmware, service processor firmware, and SPCN firmware and may have been loaded onto the disk processing system from, for example, a web site, a diskette, CD-ROM, or DVD-ROM during a previous session and stored in a non-volatile memory device such as, for example, flash memory 196 in FIG. 1. The vital product data includes topology information such as, for example, the identity and number of components contained within each drawer and the physical location of each drawer so that, if there is problem, a service technician may be directed to the correct location to service the system.

The data processing system is then initialized by the service processor (step 304). Initialization includes such functions as, for example, testing and initializing processors, such as processors 101–104 in FIG. 1, and testing and initializing memory and memory controllers, such as, for example, memories 160–163 and memory controller 108 in FIG. 1. Control is then transferred to the system firmware (step 306). Around the time that control is passed to the system firmware, the service processor copies the new system firmware that had previously been stored on a non-volatile memory, such as, for example, flash memory 196 in FIG. 1, to system memory, such as, for example, local memories 160–163, such that the new system firmware is executed on the system processors, such as, for example, processors 101–104 ion FIG. 1.

The service processor and the SPCN card then assist the system firmware with system initialization (or booting) (step 308). During this process, since the SPCN card's SPCN firmware has yet to be updated, the SPCN card uses its previous versions of the SPCN firmware to assist the system firmware in initializing the data processing system. During system initialization, the system firmware "walks" the system buses to verify connections and retrieves system configuration information previously discovered and stored by the service processor from the service processor memory, such as memory 191 in FIG. 1 or via Service Processor mailbox 194 in FIG. 1. Also, during system initialization, the system firmware locates and loads the operating system.

Once system initialization has been completed, the system firmware signals the service processor that control has been transferred to the host operating system (step 310). It is at this point that the service processor is no longer needed by the system firmware and thus, may initiate any other tasks as needed. Thus, once the system firmware has released the service processor, the service processor then updates the SPCN firmware by performing steps 312–324 as a background operation. Thus, the service processor queries the SPCN card for its current firmware level (step 312). The service processor then compares the retrieved firmware level of the SPCN card with the stored copy, such as SPCN firmware copy 199 in flash memory 196 in FIG. 1, received at the last user requested update (step 314) and determines whether the two match (step 316). If the SPCN current firmware level matches the stored copy of the firmware, then the firmware is up to date and no further action is necessary.

If the firmware level of the SPCN card does not match the stored copy of the firmware, then the stored new image of the SPCN firmware is transferred to the SPCN card of each drawer in the data processing system (step 318). Thus, for example, referring to FIG. 2, the SPCN firmware image 204 in flash memory 202 is transferred to the SPCN cards 220–226 of each of I/O drawers 210–216, where it is stored in a respective SPCN flash memory 230–236 to be used by SPCN processors 240–246. Returning to FIG. 3, once the transfer is complete, then the service processor queries the SPCN card for the current level of the SPCN's firmware and compares to the level sent (step 320) to determine if the two match (step 322). If the two do match, then the SPCN card's firmware has been successfully updated and no further action is necessary. If the two still do not match after attempting to update the SPCN card's level of the firmware, then a firmware update failure is logged to notify the user (step 324); the system continues with normal operation.

In prior art systems, the SPCN firmware of each drawer was updated around the same time as the system firmware was updated. However, although updating the system firmware and service processor firmware are relatively quick operations, updating the SPCN firmware is a very time consuming operation and may take up to approximately 15 minutes per I/O drawer. Therefore, with a system such as depicted in FIG. 1 having four I/O drawers 144–150, the update to the SPCN firmware might take around an hour. However, step 308 cannot be performed while the SPCN firmware is being updated since the SPCN cards will not be available to assist the system firmware in initialization of the data processing system until the update is complete. Therefore, when a firmware update was performed, a user was forced to wait for a prolonged period of time before the operating system was loaded and running allowing the data processing system to be used for other purposes other than firmware updates. Therefore, by delaying updating the SPCN firmware until after the operating system has been loaded and performing the update in the background, the user may use the data processing system much sooner than was possible in the prior art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of updating firmware in a system component within a data processing system, the method comprising:
responsive to receiving a notification that control has been transferred to a host operating system following completion of an initialization procedure, determining, by a service processor, whether the system component has a current level of the firmware; and
responsive to a determination that the system component does not have the current level of the firmware, updating a copy of the firmware stored in the system component in a background operation while the data processing system remains available to a user for other actions.

2. The method as recited in claim 1, further comprising:
responsive to a determination that the update failed, notifying a user of the update failure.

3. The method as recited in claim 1, wherein the system component is a system power control network card in an input/output drawer.

4. The method as recited in claim 1, wherein updating the copy of the firmware stored in the system component comprises transferring a current copy of the firmware stored in a non-volatile memory accessible by the service processor.

5. The method as recited in claim 4, wherein the non-volatile memory is a non-volatile random access memory.

6. The method as recited in claim 4, wherein the non-volatile memory is a flash memory.

7. A method for updating system firmware in a data processing system, the method comprising:
   in the background, and responsive to receiving a notification that an operating system has been loaded following completion of an initialization procedure, determining whether a level of a firmware copy on a system component matches a current level of firmware stored on a non-volatile memory within the system; and
   responsive to a determination that the level of the firmware copy is different from the current level, transferring the current level of firmware to the system component to update the firmware copy on the system component.

8. The method as recited in claim 7, further comprising:
   determining, after the update, whether a new level of the firmware copy on the system component matches the current level of the firmware stored on the system memory; and
   responsive to a determination that the new level does not match the current level, notifying a user of a firmware update failure.

9. The method as recited in claim 8, wherein the step of notifying the user of the firmware update failure comprises creating a log file.

10. The method as recited in claim 7, wherein the system component is a system power control network card within a input/output drawer.

11. The method as recited in claim 7, wherein the non-volatile memory is a non-volatile random access memory.

12. The method as recited in claim 7, wherein the non-volatile memory is a flash memory.

13. A computer program product in a computer readable media for use in a data processing system for updating firmware in a system component, the computer program product comprising:
   first instructions, responsive to receiving a notification that control has been transferred to a host operating system following completion of an initialization procedure, for determining, by a service processor, whether the system component has a current level of the firmware; and
   second instructions, responsive to a determination that the system component does not have current level of the firmware, for updating a copy of the firmware stored in the system component in a background operation while the data processing system remains available to a user for other actions.

14. The computer program product as recited in claim 13, further comprising:
   third instructions, responsive to a determination that the update failed, for notifying a user of the update failure.

15. The computer program product as recited in claim 13, wherein the system component is a system power control network card in an input/output drawer.

16. The computer program product as recited in claim 13, wherein updating the copy of the firmware stored in the system component comprises transferring a current copy of the firmware stored in a non-volatile memory accessible by the service processor.

17. The computer program product as recited in claim 16, wherein the non-volatile memory is a non-volatile random access memory.

18. The computer program product as recited in claim 16, wherein the non-volatile memory is a flash memory.

19. A computer program product in a computer readable media for use in a data processing system for updating system firmware in a data processing system, the computer program product comprising:
   first instructions, executed in the background, and responsive to receiving a notification that an operating system has been loaded following completion of an initialization procedure, for determining whether a level of a firmware copy on a system component matches a current level of firmware stored on a non-volatile memory within the system; and
   second instructions, responsive to a determination that the level of the firmware copy is different from the current level, for transferring the current level of firmware to the system component to update the firmware copy on the system component.

20. The computer program product as recited in claim 19, further comprising:
   third instructions for determining, after the update, whether a new level of the firmware copy on the system component matches the current level of the firmware stored on the system memory; and
   fourth instructions, responsive to a determination that the new level does not match the current level, for notifying a user of a firmware update failure.

21. The computer program product as recited in claim 20, wherein notifying the user of the firmware update failure comprises creating a log file.

22. The computer program product as recited in claim 19, wherein the system component is a system power control network card within a input/output drawer.

23. The computer program product as recited in claim 19, wherein the non-volatile memory is a non-volatile random access memory.

24. The computer program product as recited in claim 19, wherein the non-volatile memory is a flash memory.

25. A system for updating firmware in a system component, the system comprising:
   first means, responsive to receiving a notification that control has been transferred to a host operating system following completion of an initialization procedure, for determining, by a service processor, whether the system component has a current level of the firmware; and
   second means, responsive to a determination that the system component does not have the current level of the firmware, for updating a copy of the firmware stored in the system component in a background operation while the data processing system remains available to user for other actions.

26. The system as recited in claim 25, further comprising:
   third means, responsive to a determination that the update failed, for notifying a user of the update failure.

27. The system as recited in claim 25, wherein the system component is a system power control network card in an input/output drawer.

28. The system as recited in claim 25, wherein updating the copy of the firmware stored in the system component comprises transferring a current copy of the firmware stored in a non-volatile memory accessible by the service processor.

29. The system as recited in claim 28, wherein the non-volatile memory is a non-volatile random access memory.

30. The system as recited in claim 28, wherein the non-volatile memory is a flash memory.

31. A system for updating system firmware in a data processing system, the system comprising:

first means, executed in the background, and responsive to receiving a notification that an operating system has been loaded following completion of an initialization procedure, for determining whether a level of a firmware copy on a system component matches a current level of firmware stored on a non-volatile memory within the system; and second means, responsive to a determination that the level of the firmware copy is different from the current level, for transferring the current level of firmware to the system component to update the firmware copy on the system component.

32. The system as recited in claim 31, further comprising:

third means for determining, after the update, whether a new level of the firmware copy on the system component matches the current level of the firmware stored on the system memory; and fourth means, responsive to a determination that the new level does not match the current level, for notifying a user of a firmware update failure.

33. The system as recited in claim 32, wherein notifying the user of the firmware update failure comprises creating a log file.

34. The system as recited in claim 31, wherein the system component is a system power control network card within a input/output drawer.

35. The system as recited in claim 31, wherein the non-volatile memory is a non-volatile random access memory.

36. The system as recited in claim 31, wherein the non-volatile memory is a flash memory.

* * * * *